US012715480B2

(12) United States Patent
Alam et al.

(10) Patent No.: US 12,715,480 B2
(45) Date of Patent: Aug. 25, 2026

(54) MULTI-LEVEL DISENGAGEMENT SERVICE FOR AUTONOMOUS VEHICLES

(71) Applicants: Soo Jin Tan, Shanghai (CN); Intel Corporation, Santa Clara, CA (US)

(72) Inventors: S M Iftekharul Alam, Hillsboro, OR (US); Kuilin Clark Chen, Portland, OR (US); Leonardo Gomes Baltar, Munich (DE); Satish Jha, Portland, OR (US); Arvind Merwaday, Beaverton, OR (US); Markus Dominik Mueck, Unterhaching (DE); Suman Sehra, Folsom, CA (US); Vesh Raj Sharma Banjade, Portland, OR (US); Kathiravetpillai Sivanesan, Portland, OR (US); Soo Jin Tan, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 81 days.

(21) Appl. No.: 18/558,401

(22) PCT Filed: Sep. 24, 2021

(86) PCT No.: PCT/CN2021/120338

§ 371 (c)(1),
(2) Date: Nov. 1, 2023

(87) PCT Pub. No.: WO2023/044759

PCT Pub. Date: Mar. 30, 2023

(65) Prior Publication Data

US 2024/0233534 A1 Jul. 11, 2024

(51) Int. Cl.
*B60W 60/00* (2020.01)
*G08G 1/01* (2006.01)
(Continued)

(52) U.S. Cl.
CPC .... *B60W 60/0055* (2020.02); *B60W 60/0053* (2020.02); *G08G 1/096725* (2013.01);
(Continued)

(58) Field of Classification Search
CPC ......... B60W 60/0055; B60W 60/0053; B60W 2556/45; G08G 1/096725;
(Continued)

(56) References Cited

U.S. PATENT DOCUMENTS 9,513,632 B1 * 12/2016 Gordon ............. B60W 60/0051
2014/0156134 A1 * 6/2014 Cullinane ............ G05D 1/0223
701/23

(Continued)

FOREIGN PATENT DOCUMENTS

CN 111386217 A 7/2020
CN 112918459 A 6/2021

OTHER PUBLICATIONS

Jun. 9, 2022 (PCT) International Search Report and Written Opinion—App. PCT/CN2021/120338.

*Primary Examiner* — Dale W Hilgendorf
(74) *Attorney, Agent, or Firm* — Banner & Witcoff, Ltd.

(57) ABSTRACT

A component of an intelligent transportation infrastructure system, the component including: processing means; and a non-transitory computer-readable storage medium including instructions that, when executed by the processing means, cause the processing means to: receive, from a vehicle having autonomous driving capabilities, an autonomous driving disengagement request message; determine, based on perception data or analytics related to the vehicle or a vicinity of the vehicle, a disengagement level of a multiple-disengagement-level protocol and a corresponding post-disengagement vehicle action; and transmit to the vehicle an
(Continued)

500

| Disengagement Level (DL) | Post-Disengagement Infrastructure Role and Actions | DL Handling Priority | Communications QoS requirement (informative only, assumed to be met) |
|---|---|---|---|
| DL-1 | AV is monitored but not actively driven (vehicle subsystem is able to drive itself to safety). | Low | Bandwidth |
| DL-2 | Safe physical trajectory planning instructions (routing the vehicle to temporary destination such as repair garage or parking). | Medium | Bandwidth, Reliability |
| DL-3 | Object/event detection and issuance of response commands to aid with short term driving: maneuvering instructions and appropriate trajectory. | High | Bandwidth, High Reliability |
| DL-4 | Driving function takeover: sustained lateral and longitudinal vehicle motion (planning) and control including active steering and driving (gas, brakes). On this level, the vehicle cannot process the instructions for maneuvering and trajectories (it is DL-3 incapable) and thus infrastructure takes over the vehicle's actuation. | Urgent | Bandwidth, Ultra-High Reliability, Ultra-Low Latency |
| DL-5 | Vehicle driving subsystem may not be fully functional thus vehicle is unable to drive itself. Communications is assumed to be intact so that the vehicle is reachable by infrastructure to collect continuous status. Thus, this DL requires infrastructure to physically dispatch emergency responder(s) (e.g., towing service with human driver). | Very Urgent | Bandwidth, Reliability, Low latency |
| DL-6 | Vehicle sensors, driving, and communications subsystems are not fully functional and thus the infrastructure (e.g., RSU) has to rely on its own sensors onboard as well as the crowdsourced sensors only to perceive the situation. This DL also requires infrastructure to physically dispatch emergency responder(s) as in DL-5. | Extremely Urgent | Bandwidth, Reliability, Low latency |

autonomous driving disengagement response message including a post-disengagement vehicle action instruction.

24 Claims, 8 Drawing Sheets

(51) Int. Cl.
*G08G 1/0967* (2006.01)
*H04W 4/40* (2018.01)
*H04W 4/90* (2018.01)

(52) U.S. Cl.
CPC . *G08G 1/096775* (2013.01); *G08G 1/096783* (2013.01); *B60W 2556/45* (2020.02); *G08G 1/0141* (2013.01); *H04W 4/40* (2018.02); *H04W 4/90* (2018.02)

(58) Field of Classification Search
CPC ....... G08G 1/096775; G08G 1/096783; G08G 1/0141; H04W 4/40; H04W 4/90
See application file for complete search history.

(56) References Cited

U.S. PATENT DOCUMENTS

| | | | | |
|---|---|---|---|---|
| 2015/0241878 | A1* | 8/2015 | Crombez | B60W 60/00184 701/23 |
| 2017/0030725 | A1* | 2/2017 | Gordon | G01C 21/3415 |
| 2017/0102700 | A1* | 4/2017 | Kozak | B60W 30/00 |
| 2017/0171375 | A1* | 6/2017 | Kamata | B60W 50/082 |
| 2019/0041850 | A1* | 2/2019 | Chase | G08G 1/096725 |
| 2020/0139992 | A1* | 5/2020 | Oba | G08G 1/16 |
| 2021/0061299 | A1* | 3/2021 | Wang | B60K 35/29 |
| 2021/0339766 | A1* | 11/2021 | Karaman | B60W 40/06 |
| 2022/0063639 | A1* | 3/2022 | Stenneth | B60W 40/06 |
| 2022/0126864 | A1* | 4/2022 | Moustafa | B60W 60/0057 |
| 2022/0126878 | A1* | 4/2022 | Moustafa | B60W 60/0013 |
| 2022/0324488 | A1* | 10/2022 | Yuki | G08G 1/16 |
| 2022/0340166 | A1* | 10/2022 | Kume | G08G 1/163 |
| 2023/0049840 | A1* | 2/2023 | Qiao | G08G 1/096783 |
| 2025/0115281 | A1* | 4/2025 | An | H04W 4/44 |

* cited by examiner

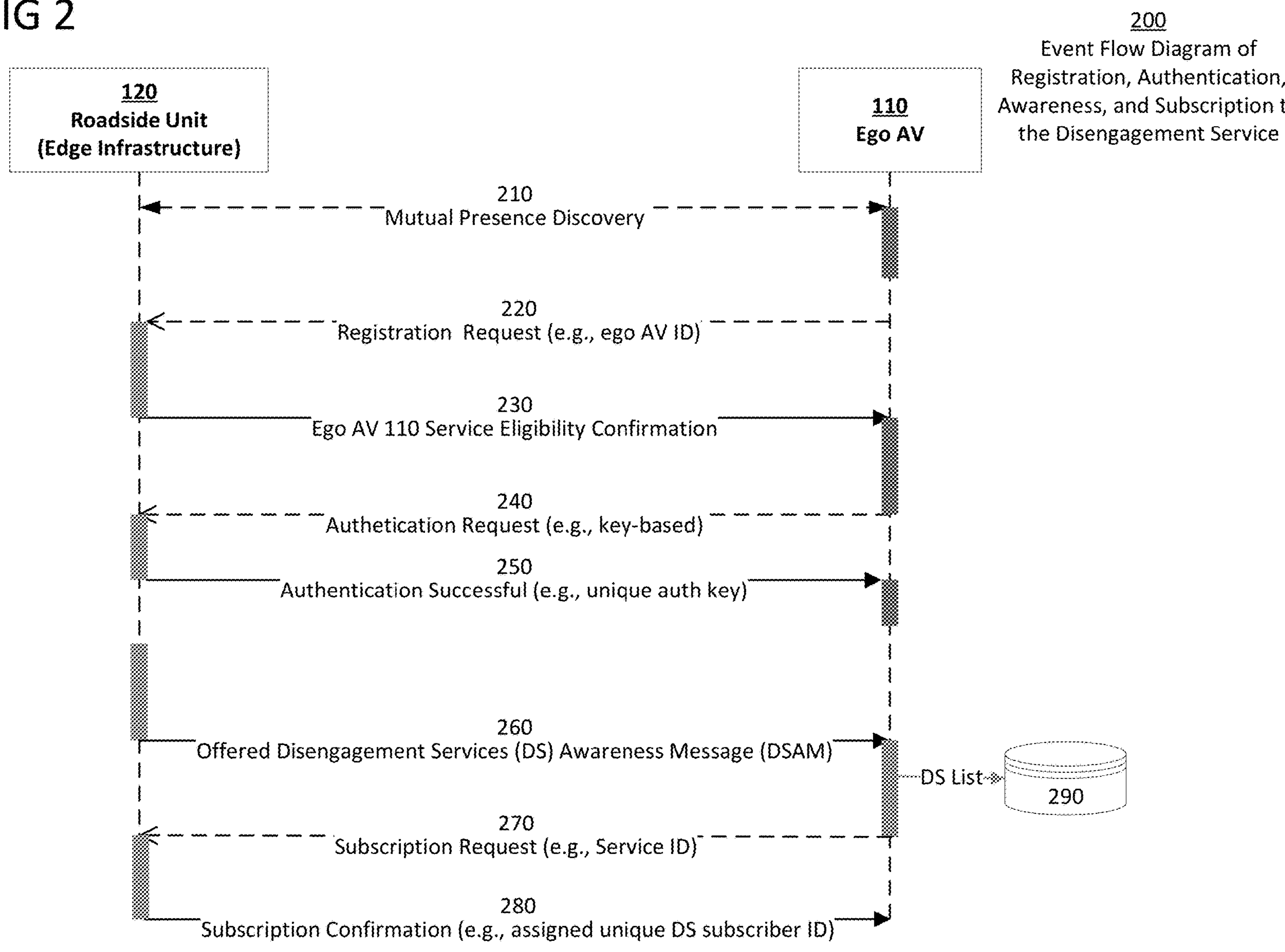
FIG 2
200
Event Flow Diagram of Registration, Authentication, Awareness, and Subscription to the Disengagement Service
120
Roadside Unit (Edge Infrastructure)
110
Ego AV
210
Mutual Presence Discovery
220
Registration Request (e.g., ego AV ID)
230
Ego AV 110 Service Eligibility Confirmation
240
Authetication Request (e.g., key-based)
250
Authentication Successful (e.g., unique auth key)
260
Offered Disengagement Services (DS) Awareness Message (DSAM)
DS List
290
270
Subscription Request (e.g., Service ID)
280
Subscription Confirmation (e.g., assigned unique DS subscriber ID)

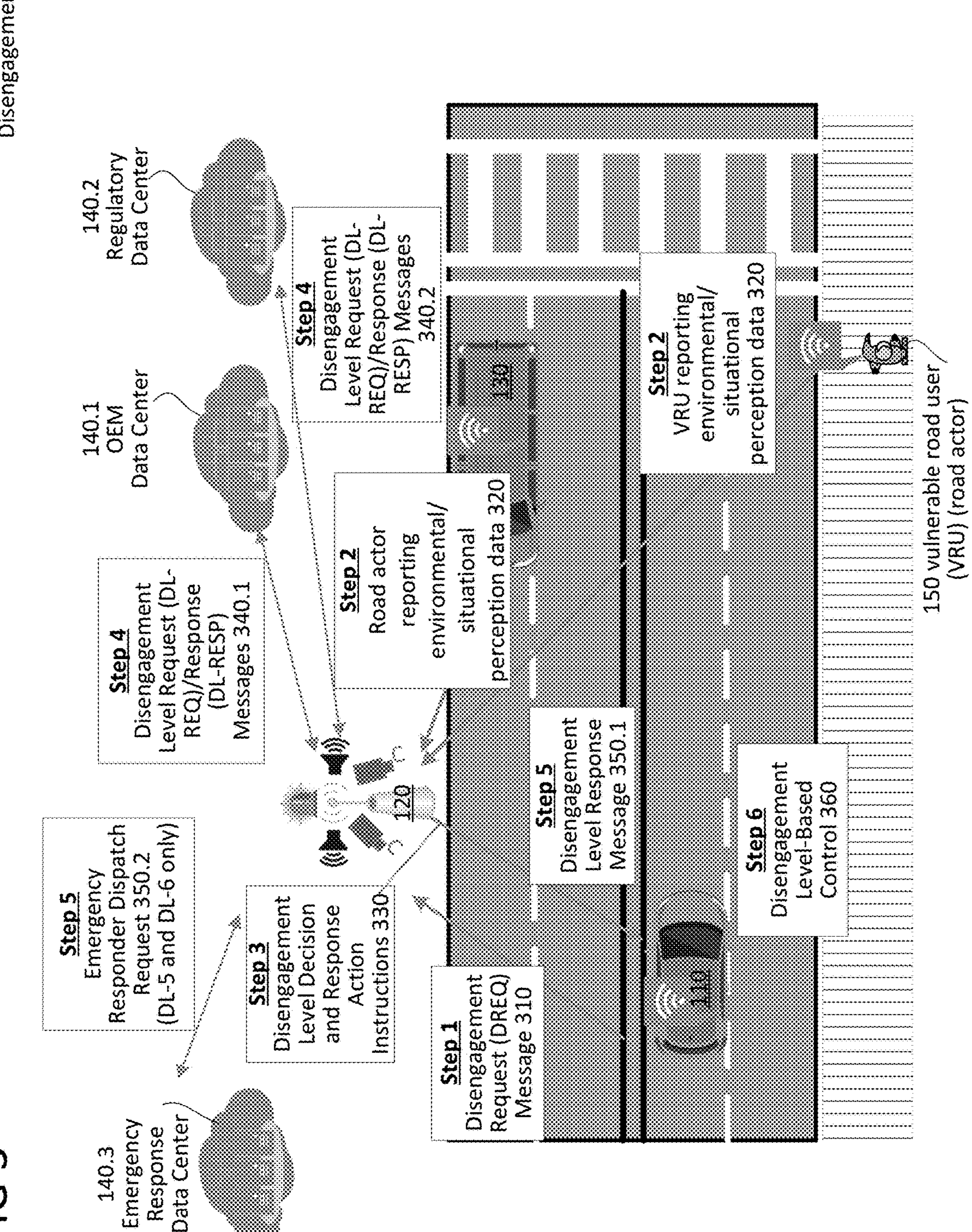
FIG 3
300
Disengagement Process
140.1
OEM
Data Center
140.2
Regulatory
Data Center
140.3
Emergency
Response
Data Center
Step 5
Emergency
Responder Dispatch
Request 350.2
(DL-5 and DL-6 only)
Step 3
Disengagement
Level Decision
and Response
Action
Instructions 330
Step 4
Disengagement
Level Request (DL-
REQ)/Response
(DL-RESP)
Messages 340.1
Step 4
Disengagement
Level Request (DL-
REQ)/Response (DL-
RESP) Messages
340.2
Step 2
Road actor
reporting
environmental/
situational
perception data 320
Step 2
VRU reporting
environmental/
situational
perception data 320
120
130
110
Step 1
Disengagement
Request (DREQ)
Message 310
Step 5
Disengagement
Level Response
Message 350.1
Step 6
Disengagement
Level-Based
Control 360
150 vulnerable road user
(VRU) (road actor)

| Reason | Sub-reason | | Cause ID (CID) |
|---|---|---|---|
| Human Factor | Disruptive passenger in cabin | | 1.1 |
| | Unpredictable behavior from pedestrians, cyclists on road | | 1.2 |
| System Failure | SW errors | | 2.1 |
| | Perception errors | | 2.2 |
| | Planner not ready | | 2.3 |
| | Traffic light detection | | 2.4 |
| | Lane change | | 2.5 |
| | Unwanted maneuver of vehicle | | 2.6 |
| | Other System Failures | | 2.7 |
| | **Sub-cause** | **Sub-cause ID (SCID)** | |
| | System Tuning/Calibration | 2.7.1 | |
| | HW discrepancy | 2.7.2 | |
| | Localization error | 2.7.3 | |
| | Incorrect behavior predictor | 2.7.4 | |
| | Requirement not satisfied | 2.7.5 | |
| | Address planning | 2.7.6 | |
| | Watchdog error | 2.7.7 | |
| | Planner data | 2.7.8 | |
| | Vehicle conflict-failure | 2.7.9 | |
| | Departure logic | 2.7.10 | |
| | Stock vehicle fault | 2.7.11 | |
| | Data error | 2.7.12 | |
| | Drop off data | 2.7.13 | |
| | AV controller | 2.7.14 | |
| | Position estimation | 2.7.15 | |
| | Cruise fault | 2.7.16 | |
| | Address controls | 2.7.17 | |
| | Unknown failure | 2.7.18 | |
| External Condition | Poorly marked lines | | 3.1 |
| | Construction zone | | 3.2 |
| | Heavy VRU/pedestrian traffic | | 3.3 |
| | Weather condition: {e.g. Sunny, cloudy, rainy, clear, snowy} | | 3.4 |
| | Other external condition factors | | 3.5 |
| | **Sub-cause** | **Sub-cause** | |
| | Emergency vehicle | 3.5.1 | |
| | Lateral actors | 3.5.2 | |
| | Cyclist conflict | 3.5.3 | |
| | Vehicle conflict | 3.5.4 | |
| | External debris on road | 3.5.5 | |
| | Poor road condition | 3.5.6 | |
| Other | Planner output invalid | | 4.1 |
| | Follower output invalid | | 4.2 |
| | ACC cancel | | 4.3 |
| | Health monitor | | 4.4 |

| Disengagement Level (DL) | Post-Disengagement Infrastructure Role and Actions | DL Handling Priority | Communications QoS requirement (informative only, assumed to be met) |
|---|---|---|---|
| DL-1 | AV is monitored but not actively driven (vehicle subsystem is able to drive itself to safety). | Low | Bandwidth |
| DL-2 | Safe physical trajectory planning instructions (routing the vehicle to temporary destination such as repair garage or parking). | Medium | Bandwidth, Reliability |
| DL-3 | Object/event detection and issuance of response commands to aid with short term driving: maneuvering instructions and appropriate trajectory. | High | Bandwidth, High Reliability |
| DL-4 | Driving function takeover: sustained lateral and longitudinal vehicle motion (planning) and control including active steering and driving (gas, brakes). On this level, the vehicle cannot process the instructions for maneuvering and trajectories (it is DL-3 incapable) and thus infrastructure takes over the vehicle's actuation. | Urgent | Bandwidth, Ultra-High Reliability, Ultra-Low Latency |
| DL-5 | Vehicle driving subsystem may not be fully functional thus vehicle is unable to drive itself. Communications is assumed to be intact so that the vehicle is reachable by infrastructure to collect continuous status. Thus, this DL requires infrastructure to physically dispatch emergency responder(s) (e.g., towing service with human driver). | Very Urgent | Bandwidth, Reliability, Low latency |
| DL-6 | Vehicle sensors, driving, and communications subsystems are not fully functional and thus the infrastructure (e.g., RSU) has to rely on its own sensors onboard as well as the crowdsourced sensors only to perceive the situation. This DL also requires infrastructure to physically dispatch emergency responder(s) as in DL-5. | Extremely Urgent | Bandwidth, Reliability, Low latency |

600
Autonomous Vehicle

700
Safety System

870 Alert Device
850 GPS/Wireless Antenna
800
Roadside Unit (RSU)
840
GPS Receiver
830
Wireless Communications Device
820
Processing Circuitry
810
Memory
880
Sensing/Perception Devices (e.g., radar, lidar)
860
Image Acquisition Devices (e.g., cameras)

MULTI-LEVEL DISENGAGEMENT SERVICE FOR AUTONOMOUS VEHICLES

TECHNICAL FIELD

The present disclosure generally relates to intelligent transportation infrastructure-based multi-level disengagement service for autonomous vehicles.

BACKGROUND

An autonomous vehicle (AV) need for disengagement arises when one or more of the AV subsystems (e.g., driving, sensory, regulatory, etc.) face an unforeseen or unmanageable circumstance. Many disengagements involve non-critical risks and occur at relatively low speeds. This indicates that current AV operating technologies are not ready for fully-autonomous deployment, especially in urban scenarios. Moreover, in adverse environmental and physical surrounding conditions such as bad weather, snow, heavy rain, road construction, and others, AVs may have even higher disengagement rates.

To address such issues, a fundamental requirement to handle disengagement events is to have a backup vehicle control mechanism. Intuitively, the best known approach has been to have a human backup driver within the AV. However, having a human driver at all times is not practical, and even if present, handing over post-disengagement AV control to a human driver can be risky. Reaction times to take control of the vehicle in the event of disengagement is not always sufficient considering additional human factors such as distractions, state-of-mind, lack-of-attentiveness, etc. The margin for error in handling such events is low, and having a human in the loop is not always the best solution. Additionally, permissions for human-based teleoperation of vehicles may be subject to local authorities across various geographic regions.

BRIEF DESCRIPTION OF THE DRAWINGS

FIG. 2 illustrates an event flow diagram of registration, authentication, awareness, and subscription to a disengagement service in accordance with aspects of the disclosure.

FIG. 3 illustrates a disengagement process in accordance with aspects of the disclosure.

FIG. 4 illustrates a Table of categorization of causes/reasons for disengagement in accordance with aspects of the disclosure.

FIG. 5 illustrates a Table of multiple disengagement levels and features in accordance with aspects of the disclosure.

DESCRIPTION OF THE ASPECTS

This disclosure is directed to an intelligent transportation infrastructure-based autonomous vehicle (AV) disengagement service having multiple disengagement level (DL)-based handling as required by a situation or environment, and as requested by an AV prone to a potential disengagement. The disengagement service enables detection of situations of AV disengagement, decision to initiate disengagement, and data exchange protocols and message content to realize the disengagement with various demand types ranging from minimal driving control, medium control, full driving control, and no-possible control (extreme event). The service is executed by edge infrastructure, such as a roadside unit (RSU), to better address real-time, high reliability, and high availability connectivity requirements imposed by disengagement events demanding urgent handling.

Figure 1:
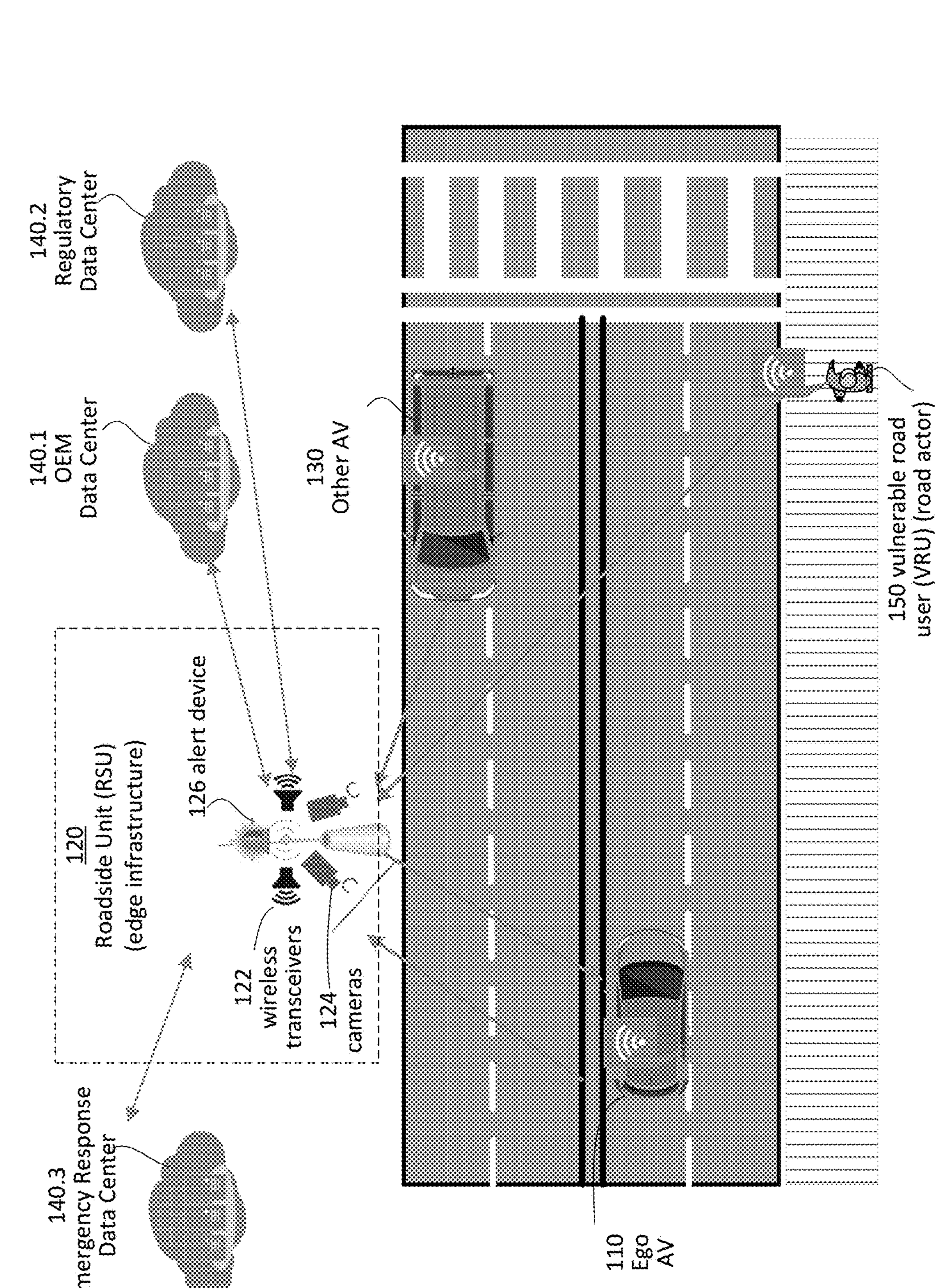
FIG. 1 illustrates an example intelligent transportation infrastructure system in accordance with aspects of the disclosure.

FIG. 1 illustrates an example intelligent transportation infrastructure system 100 in accordance with aspects of the disclosure.

The intelligent transportation infrastructure system 100 comprises an ego AV 110, a roadside unit (RSU) (edge infrastructure) 120, another AV 130, data centers 140 (e.g., OEM data center 140.1, a regulatory data center 140.2, emergency response data center 140.3), and a vulnerable road user (road actor) 150. Each of these components has wireless, cellular, and/or wireline communication capability.

The ego AV 110 has autonomous driving capabilities. The term "autonomous vehicle" may describe a vehicle capable of implementing at least one navigational change without driver input. A navigational change may describe or include a change in one or more of steering, braking, or acceleration/deceleration of the vehicle. A vehicle may be described as autonomous even in case the vehicle is not fully automatic (for example, fully operational with driver or without driver input). AVs may include those vehicles that can operate under driver control during certain time periods and without driver control during other time periods. AVs may also include vehicles that control only some aspects of vehicle navigation, such as steering (e.g., to maintain a vehicle course between vehicle lane constraints) or some steering operations under certain circumstances (but not under all circumstances), but may leave other aspects of vehicle navigation to the driver (e.g., braking or braking under certain circumstances). AVs may also include vehicles that share the control of one or more aspects of vehicle navigation under certain circumstances (e.g., hands-on, such as responsive to a driver input) and vehicles that control one or more aspects of vehicle navigation under certain circumstances (e.g., hands-off, such as independent of driver input). AVs may also include vehicles that control one or more aspects of vehicle navigation under certain circumstances, such as under certain environmental conditions (e.g., spatial areas, roadway conditions). In some aspects, AVs may handle some or all aspects of braking, speed control, velocity control, and/or steering of the vehicle. An AV may include those vehicles that can operate without a driver. The level of autonomy of a vehicle may be described or determined by the Society of Automotive Engineers (SAE) level of the vehicle (e.g., as defined by the SAE, for example in SAE J3016 2018: Taxonomy and definitions for terms related to driving automation systems for on road motor vehicles) or by other relevant professional organizations. The SAE level may have a value ranging from a minimum level, e.g. level 0 (illustratively, substantially no driving automation), to a maximum level, e.g. level 5 (illustratively, full driving automation).

The RSU 120 comprises one or more wireless (or wireline) transceivers 122, one or more image acquisition devices 124 (e.g., cameras), one or more alert devices 126 (e.g., flashing red light), one or more processors (processing circuitry) (not shown), one or more non-transitory computer-readable storage mediums (not shown), among other elements. The RSU 120 is generally located at an edge of the intelligent transportation infrastructure system 100 (e.g., disposed along a road in which the ego AV 110 travels or is parked), but the disclosure is not limited in this respect.

The RSU 120 may be communicatively coupled to the data centers 140 via Ethernet, optical, wireless, wireline or cellular, and the like. Also, the RSU 120 may employ dedicated communication protocols such as dedicated short range communications (DSRC) or similar protocols. The DSRC may be one-way or two-way short-range to medium-range wireless communication channels for automotive use and a corresponding set of protocols (e.g., including open-source) and standards (e.g., in the United States, Europe, etc.). The DSRC or similar protocol may provide for communications between the RSU 120 and the ego AV 110, other AV 130, VRU 150 and/or other RSUs, among others.

Step 0—Registration, Authentication, Awareness and Subscription to the Disengagement Service (DS)

FIG. 2 illustrates an event flow diagram 200 of registration, authentication, awareness, and subscription to a disengagement service in accordance with aspects of the disclosure.

Prior to the disengagement service, there is a setup for the ego AV 110 before a need for disengagement arises. A mutual presence discovery 210 occurs via a broadcast-based discovery messaging exchange between the RSU 120 and the ego AV 110. This is followed by a pre-disengagement service registration 220-230, authentication 240-250, awareness 260 of the disengagement service offered by the RSU 120 (edge infrastructure), and subscription 270-280 of the ego AV 110 to the disengagement service.

The pre-disengagement service registration phase 220-230 includes the ego AV 110 transmitting to the RSU 120 a registration request message 220, including, for example, an ego AV identification (ID). The RSU 120 responds by sending the ego AV 110 a service eligibility confirmation message 230.

The authentication phase 240-250 includes the ego AV 110 transmitting to the RSU 120 an authentication request message 240. The RSU 120 responds by sending the ego AV 110 an authentication successful message 250. This authentication may be secure in that the authentication request message 240 may be key-based, in which case the authentication successful message 250 includes a unique authentication key.

The disengagement service phase 260 includes the RSU 120 transmitting to the AV 110 an offered disengagement services (DS) awareness message (DSAM) 260. The DSAM 260 is mainly for providing the ego AV 110 with a list of offered disengagement services, such as disengagement levels, that are available at the RSU 120. This list of disengagement services may be stored in a database 290.

During the subscription phase 270-280, the ego AV 110 initiates a subscription request 270 with a specific service ID pertaining to a disengagement service subscription available to choose as one of the options specified in the DSAM 260. In response, the RSU 120 sends the subscription confirmation 280 along with the assigned unique disengagement service subscriber ID. The subscriber ID can be an independently but uniquely assigned disengagement service subscriber ID by the RSU 120.

FIGS. 3-5 illustrates details of the disengagement service in accordance with aspects of the disclosure. FIG. 3 illustrates a disengagement process 300. FIG. 4 illustrates a Table 400 of categorization of causes/reasons for disengagement. And FIG. 5 illustrates a Table 500 of multiple disengagement levels and features. It should be appreciated that Tables 400 and 500 are merely examples and not meant to be limiting.

Following this registration, authentication, awareness, and subscription to a disengagement service of Step 0, the infrastructure-based disengagement service including Steps 1-6 begins.

Step 1—Autonomous Driving Disengagement Request Message 310

The ego AV 110 has autonomous driving capabilities, and may determine, based on its sensor and control data or statistics, that it should request disengagement service from the infrastructure. The ego AV 110 thus initiates disengagement request (DREQ). The ego AV 110 generates a disengagement request DREQ message 310. The autonomous driving disengagement request message 310 could be triggered by sensors of the ego AV 110, or alternatively by a passenger in the ego AV 110.

The disengagement request message 310 comprises of one or more of, but not limited to, the following AV-related data: unique ego AV ID, ego AV geographic position, ego AV sensor status, ego AV control system status, and ego AV requesting to disengage, environmental/situational perception data/analytics with respective timestamps, and any other incident specific analytics such as an imminent crash, minor/major accidents, etc. The unique ego AV ID at the RSU 120 is established during Step 0 above. The ego AV Geographic Position may be in X, Y, Z coordinates, for example. The ego AV sensor information may include, for example, type (e.g., camera, LIDAR, radar) and confidence regarding detection area (e.g. including free space and object list as in Collective Perception Service (CPS) in ETSI). The AV sensor status may include, for example, on/off, active (in wake-up mode), working, defective, etc. The AV control system status may include, for example, active, off, working, or defective. The ego AV requesting to disengage may be yes or no.

The RSU 120 receives from the ego AV 110 the disengagement request message 310, which may also include perception data and/or an analytics report related to the ego AV 110 or a vicinity of the ego AV 110. The disengagement request message 310 may also include a reason to disengage. Unique IDs, referred to herein as Cause IDs (CIDs) and sub-CIDs, are assigned to the reasons and sub-reasons for disengagement. CIDs and sub-CIDs are shown in the Table 400 of FIG. 4, which is merely an example and not considered to be limiting. The RSU 120 or other portion of the infrastructure is assumed to have a stored lookup table, and the ego AV 110 only needs to report the CID and sub-CID to specify the reason.

Step 2—Collection of Environmental/Situational Perception Data 320 From Other Road Actors Upon reception of the autonomous driving disengagement request message 310, the RSU 120 may optionally initiate a pull request 320 for additional environmental and perception data from nearby actors such as other AVs 130, VRUs 150, other RSUs and/or the like which are in the vicinity of the ego AV 110. The determination of a disengagement level, as discussed further below, may be based at least partially on this pulled perception data.

This additional environmental and situational perception data in the vicinity of the ego AV 110 may be requested by the RSU 120 to verify its own perception data and analytics via acquiring redundant or diverse information of the environment surrounding the ego AV 110. The RSU 120 may have its own image acquisition (e.g., cameras) and sensing/perception devices (e.g., radar and lidar). The data format may be based on, for example, the ETSI collection perception service (CPS), and include fields such as detection, tracking, location information, layered cost maps, sensor information, perceived static/dynamic objects, which redundantly or cooperatively help to gather more information of the surrounding environment of the ego AV 110. Such data can serve as redundant or augmented perception of the environment or situation in addition to that generated by RSU 120's own sensors. This pull mechanism aids the RSU 120 in arriving at a decision as to which level of disengagement needs to be assigned to the received disengagement request message 310 and further prepare itself for execution of a subsequent disengagement level response.

Alternatively or additionally, the perception data or analytics report may be provided by the ego AV 110, a road actor 130, 150, or another RSU in the vicinity of the ego AV 110, prior to the reception of the autonomous driving disengagement request message 310. The RSU 120 is capable of making the disengagement decision without relying on surrounding AVs 130. The surrounding vehicles 130 would be sharing their perception data with the RSU 120 in general anyway, and the perception data is at the RSU 120's disposal. In some cases, the RSU 120 may also specifically request additional data from the surrounding vehicles 130, pedestrians/VRUs 150 or other RSUs in the immediate vicinity in real-time in case its own sensors' Field of Views (FoVs) are obstructed and/or the ego AV sensor data and/or analytics report are not available.

Step 3—Disengagement Level Decision and Response Action Instructions 330 Generation at the RSU 120

The RSU 120 determines, based on the perception data and/or analytics, a disengagement level of a multiple-disengagement-level protocol and a corresponding post-disengagement vehicle action.

The RSU 120 aggregates and processes the sensor data/analytics available at its disposal coming from one or more sources: (1) the RSU 120's own perception of the situation or environment surrounding the ego AV 110; (2) the ego AV provided data/analytics; and (3) surrounding road actors' provided data/analytics.

The RSU 120 then makes a decision on the level of disengagement needed to respond to the disengagement level request DREQ message 310, and generates instructions 330 for undertaking a course of action. FIG. 5 shows Table 500 listing multiple disengagement levels (DLs) and features at the RSU 120's disposal for arriving at a decision.

The RSU 120, in compliance with the local regulations, makes the decision of disengagement and the levels. Also, once the decision on the DL is made, the actions to be undertaken under different priorities/DLs could be mapped to the urgency of the cause (e.g., very urgent versus less urgent) as well as the frequency of the causes (e.g., most frequent versus less frequent).

Step 4—Generation of Disengagement Level Request/Response Message 340

Prior to the RSU 120 transmitting to the ego AV 110 post-disengagement vehicle action instructions, the RSU 120 may transmit to a data center 140 a disengagement level request DL-REQ message 340 (340.1 or 340.2) including the determined or potential disengagement level and the corresponding post-disengagement vehicle action, or one or more potential disengagement levels and corresponding actions, for one or more compliance checks. This disengagement level request message may also include perception data and/or analytics related to the ego AV 110 or the vicinity of the ego AV 110 and/or periodic/persistent disengagement logs and negotiations. The data center 140 may be, for example, an original equipment manufacturer (OEM) data center 140.1 for compliance check with a capability of the ego AV 110.

Alternatively or additionally, the data center 140 may be a regulatory data center 140.2 for compliance check with local regulations as the disengagement enforcement techniques can be different in different geographical regions. Towards this end, the definition of risk, safety levels, and permissible levels of disengagements should be compliant with the local laws. Thus the interaction of the RSU 120 with the regulatory data center 140.2 is important to exchange checks related to legal compliance including obtaining exclusive permissions depending on the safety severity/urgency. Different geographic areas may have different laws regarding who can intervene in an emergency. For instance, in Germany no drivers are allowed in the AVs to intervene in an emergency. Rather, a technical supervisor who can remotely monitor the AV but not remotely drive the AV primarily due to safety laws associated with AVs may be allowed. Even the alternative maneuvers proposed by the AV may not be approved if they do not comply with the road traffic law and are deemed as risky. Thus, regulation checks based on disengagement level request DL-REQ message 340.2 and the corresponding disengagement level response DL-RESP message 340.2 can be a worthwhile step for disengagement service realization across different geographical regions.

Once all the compliance checks are completed, the one or more data centers 140 send to the RSU 120 a disengagement level response DL-RESP message 340, including the action to be undertaken for safe execution of the disengagement per Table 400, indicating whether the potential disengagement level and action specified in disengagement level request DL-REQ message 340 can be executed on the ego AV 110 complying with the OEMs and/or the local jurisdiction. The RSU 120 will wait to transmit the autonomous driving disengagement response message 350 with action instructions to the ego AV 110 until after receiving from the data center 140 the disengagement level response DL-RESP message 340 indicating capability compliance and/or regulatory compliance.

Optionally, the disengagement level request DL-REQ message 340 may also include the option of backing up the disengagement request DREQ analytics/statistics (law permitting) to the cloud to create a historical database for further analysis. The disengagement request DREQ-based analytics associated with local areas are stored in the database and updated periodically, as per demand. The analytical/statistical database can help determine specific areas where AVs are prone to disengagement, and assist government agencies in reducing future disengagement issues by working on such areas (e.g., fixing the road, installing more sensors, installing more infrastructure, etc.). However, this feature is optional, and the RSU 120 may be capable of computing the analytics/statistics.

Step 5—Transmit Specific DL-Based Appropriate Action Instruction Message 350

Upon reception of the disengagement level response DL-RESP message 340 (340.1, 340.2) indicating compliance, the RSU 120 then transmits to the ego AV 110 an autonomous driving disengagement response action instruction message 350 (350.1 or 350.2) including a post-disengagement vehicle action instruction as shown in the Table 500 of FIG. 5. "Alternatively or additionally in the case of DL-5 (very urgent) or DL-6 (extremely urgent), the RSU 120 transmits the specific DL-based appropriate action message 350 to the emergency response data center 140.3.

At the same time the RSU 120 may transmit to another vehicle 130, VRU 150 or other RSU in the intelligent transportation infrastructure system 100 in the vicinity of the ego AV 110 a broadcast message, siren, alarm, or the like an indication about the imminent disengagement in their surrounding environment in order to build roadside awareness. Such information can be used even by local traffic authorities for traffic planning, re-routing, road closures, or other similar action per compliance with the local rules. Additionally, depending on the urgency or situation, such information is useful for announcing or broadcasting disengagement related ad-hoc closure of road sections.

Usually the post-disengagement vehicle action instruction message 350 causes a level of the ego AV 110's autonomous driving control to be reduced, though the disclosure is not limited in this respect. The instruction may cause the level to remain the same, though perhaps in a different manner, or even be increase in some circumstances.

Step 6—Disengagement Level Response AV Control 360 and/or Emergency Responder Dispatch The disengagement level response AV control 360 and/or emergency responder dispatch (for DL-5 and DL-6 only) is then executed per the Table 500 of FIG. 5.

DL-6 is defined herein as a more hazardous and thus extremely urgent situation. The RSU 120 can undertake specific mechanisms while maneuvering the ego AV 110 if the ego AV 110 has disengaged due to bad weather for instance, leading to sensor blackout, which means that one or more of the sensors may not be fully function or completely "blacked out" (i.e., have no perception capability). Some example situations are as follows.

A first example situation is when the sensors on the ego AV 110 do not work, but the sensors at the RSU 120 are functional. The maneuvering would be based on the RSU sensors. In a situation in which the RSU sensors are also not functional, the RSU 120 may still fetch sensor data from one or more vehicles 130 or other actors on the road (e.g., VRUs 150) having sensors that are operational.

A second example situation is one in which none of the sensors (e.g., ego AV 110, RSU 120, other vehicle 130, VRU 150) are operational and are "blacked out." In this case, before the blackout, the ego AV 110 should have been reporting analytics to the RSU 120. The RSU 120 would have a prior corresponding MAP—HD map of the road segment, static objects, and/or dynamic objects before the blackout. Based on that data, the RSU 120 then computes the safety metrics (e.g., minimum distance checks with the obstacles/objects in the vicinity) needed for safe maneuvering and bringing the ego AV 110 to a stop. The resulting waypoints/trajectory/maneuvering instructions are then shared with the ego AV 110, which then executes the instructions to maneuver itself to safety (e.g., execution of the ego AV 110's emergency safe stop mode).

A third example situation is one in which the RSU 120 can also additionally or optionally issue commands to the emergency response data center 140.3, as well as the regulatory data center 140.2, to close the specifically weather affected road segment, depending on the disengagement level. Such closures would be communicated, for example, via locally available announcement services, to the re-route potential users of the road segment while the segment is under RSU-assisted maneuvering operations.

A fourth example situation is where in addition to the intervention by the RSU 120, the ego AV passenger have the option of deactivating the autonomous driving function mainly for a sense of safety for the occupants. The possible disengagement action resulting from the passenger-triggered control would generate the disengagement request DREQ type of message, but with a field indicating that this disengagement request DREQ message 310 is passenger-initiated. Such passenger-initiated disengagement request REQ would be classified into DL-6, and a corresponding action is undertaken.

Optionally, at any step or level of disengagement, in exceptions such as blacked out sensors, completely broken-down automated driving control functions, etc., the help of a remote/tele-human-in-the-loop driver located in the cloud may be taken with request by the infrastructure for a short tele-operated driving to safety. However, this is optional and subject to local laws as well and invokable if the RSU 120 invokes such a request. Another reason for invoking such tele-operated driving may be, again, to comply with government regulations that retain such functionalities in unforeseen circumstances. Thus, this disclosure does not preclude the possibility of having at the edge infrastructure with human-in-the-loop or the cloud with human-in-the-loop capability and invocation of tele-operated driving.

Frequent or occasional need for disengagement for AVs when one or more of the AV subsystems face unforeseen or unmanageable circumstances is expected to be a hindrance in the adoption of AVs on public roads. The infrastructure-based AV disengagement with multiple-levels of handling provisions as required by the situation or environment and as requested by the AV prone to potential disengagement ensures safe and efficient handling of disengagement situations for AVs in times of such situation or environmental triggers.

Figure 6:
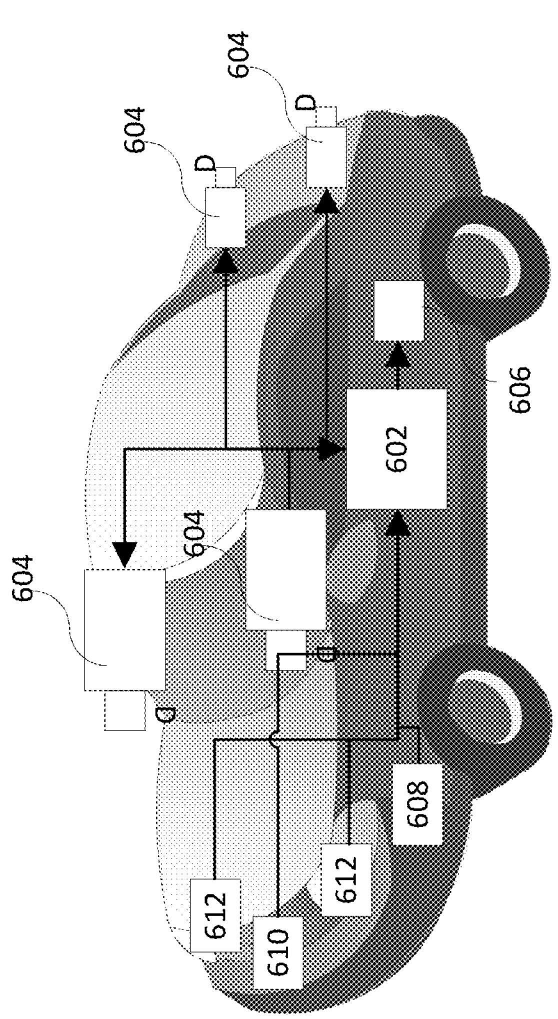
FIG. 6 illustrates an autonomous vehicle in accordance with aspects of the disclosure.
Figure 7:
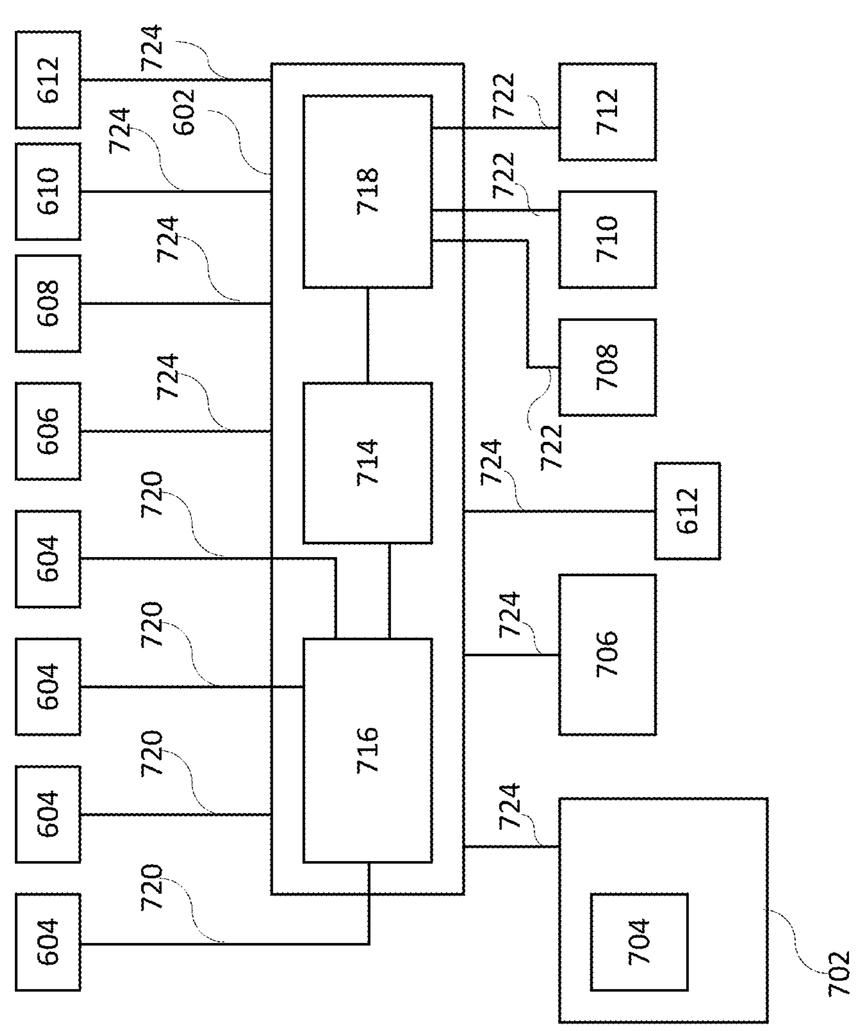
FIG. 7 illustrates a safety system in accordance with aspects of the disclosure.

FIG. 6 shows an AV 600 including a safety system 700 (see also FIG. 7). It is appreciated that AV 600 and safety system 700 are exemplary in nature and may thus be simplified for explanatory purposes. Locations of elements and relational distances are provided as examples and are not limited thereto. The safety system 700 may include various components depending on the requirements of a particular implementation. As shown in FIG. 6 and FIG. 7, the safety system 700 may include one or more processors 602, one or more image acquisition devices 604 such as, e.g., one or more cameras, one or more position sensors 606 such as a Global Navigation Satellite System (GNSS), e.g., a Global Positioning System (GPS), one or more memories 702, one or more map databases 704, one or more user interfaces 706 (such as, e.g., a display, a touch screen, a microphone, a loudspeaker, one or more buttons and/or switches, and the like), and one or more wireless transceivers 708, 710, 712. The wireless transceivers 708, 710, 712 may be configured according to different desired radio communication protocols or standards. By way of example, a wireless transceiver (e.g., a first wireless transceiver 708) may be configured in accordance with a Short Range mobile radio communication standard such as e.g. Bluetooth® Zigbee®, and the like. As another example, a wireless transceiver (e.g., a second wireless transceiver 710) may be configured in accordance with a Medium or Wide Range mobile radio communication standard such as e.g. a 3G (e.g. Universal Mobile Telecommunications System—UMTS), a 4G (e.g. Long Term Evolution—LTE), or a 5G mobile radio communication standard in accordance with corresponding 3GPP (3rd Generation Partnership Project) standards. As a further example, a wireless transceiver (e.g., a third wireless transceiver 712) may be configured in accordance with a Wireless Local Area Network communication protocol or standard such as e.g. in accordance with IEEE 802.11 (e.g. 802.11, 802.11a, 802.11b, 802.11 g, 802.11n, 802.11p, 802.11-12, 802.11ac, 802.11ad, 802.11ah, and the like). The one or more wireless transceivers 708, 710, 712 may be configured to transmit signals via antenna system over an air interface.

The one or more processors 602 may include an application processor 714, an image processor 716, a communication processor 718, or any other suitable processing device. Similarly, image acquisition devices 604 may include any number of image acquisition devices and components depending on the requirements of a particular application. Image acquisition devices 604 may include one or more image capture devices (e.g., cameras, CCDs (charge coupling devices), or any other type of image sensor). The safety system 700 may also include a data interface communicatively connecting the one or more processors 602 to the one or more image acquisition devices 604. For example, a first data interface may include any wired and/or wireless first link 720 or first links 720 for transmitting image data acquired by the one or more image acquisition devices 604 to the one or more processors 602, e.g., to the image processor 716.

The wireless transceivers 708, 710, 712 may be coupled to the one or more processors 602, e.g., to the communication processor 718, e.g., via a second data interface. The second data interface may include any wired and/or wireless second link 722 or second links 722 for transmitting radio transmitted data acquired by wireless transceivers 708, 710, 712 to the one or more processors 602, e.g., to the communication processor 718.

The memories 702 as well as the one or more user interfaces 706 may be coupled to each of the one or more processors 602, e.g., via a third data interface. The third data interface may include any wired and/or wireless third link 724 or third links 724. Furthermore, the position sensor 606 may be coupled to each of the one or more processors 602, e.g., via the third data interface.

Such transmissions may also include communications (one-way or two-way) between the AV 600 and one or more other (target) AVs in an environment of the AV 600 (e.g., to facilitate coordination of navigation of the AV 600 in view of or together with other (target) AVs in the environment of the AV 600), or even a broadcast transmission to unspecified recipients in a vicinity of the transmitting AV 600.

One or more of the transceivers 708, 710, 712 may be configured to implement one or more vehicle to everything (V2X) communication protocols, which may include vehicle to vehicle (V2V), vehicle to infrastructure (V2I), vehicle to network (V2N), vehicle to pedestrian (V2P), vehicle to device (V2D), vehicle to grid (V2G), and other protocols.

Each processor 714, 716, 718 of the one or more processors 602 may include various types of hardware-based processing devices. By way of example, each processor 714, 716, 718 may include a microprocessor, pre-processors (such as an image pre-processor), graphics processors, a central processing unit (CPU), support circuits, digital signal processors, integrated circuits, memory, or any other types of devices suitable for running applications and for image processing and analysis. In some aspects, each processor 714, 716, 718 may include any type of single or multi-core processor, mobile device microcontroller, central processing unit, etc. These processor types may each include multiple processing units with local memory and instruction sets. Such processors may include video inputs for receiving image data from multiple image sensors and may also include video out capabilities.

Any of the processors 714, 716, 718 disclosed herein may be configured to perform certain functions in accordance with program instructions which may be stored in a memory of the one or more memories 702. In other words, a memory of the one or more memories 702 may store software that, when executed by a processor (e.g., by the one or more processors 602), controls the operation of the system, e.g., the safety system. A memory of the one or more memories 702 may store one or more databases and image processing software, as well as a trained system, such as a neural network, or a deep neural network, for example. The one or more memories 702 may include any number of random access memories, read only memories, flash memories, disk drives, optical storage, tape storage, removable storage and other types of storage.

In some aspects, the safety system 700 may further include components such as a speed sensor 608 (e.g., a speedometer) for measuring a speed of the AV 600. The safety system may also include one or more accelerometers (either single axis or multiaxis) (not shown) for measuring accelerations of the AV 600 along one or more axes. The safety system 700 may further include additional sensors or different sensor types such as an ultrasonic sensor, a thermal sensor, one or more radar sensors 610, one or more LIDAR sensors 612 (which may be integrated in the head lamps of the AV 600), and the like. The radar sensors 610 and/or the LIDAR sensors 612 may be configured to provide pre-processed sensor data, such as radar target lists or LIDAR target lists. The third data interface may couple the speed sensor 608, the one or more radar sensors 610 and the one or more LIDAR sensors 612 to at least one of the one or more processors 602.

The one or more memories 702 may store data, e.g., in a database or in any different format, that, e.g., indicate a location of known landmarks. The one or more processors 602 may process sensory information (such as images, radar signals, depth information from LIDAR or stereo processing of two or more images) of the environment of the AV 600 together with position information, such as a GPS coordinate, a AV's ego-motion, etc., to determine a current location of the AV 600 relative to the known landmarks, and refine the determination of the AV's location. Certain aspects of this technology may be included in a localization technology such as a mapping and routing model.

The map database 704 may include any type of database storing (digital) map data for the AV 600, e.g., for the safety system 700. The map database 704 may include data relating to the position, in a reference coordinate system, of various items, including roads, water features, geographic features, businesses, points of interest, restaurants, gas stations, etc. The map database 704 may store not only the locations of such items, but also descriptors relating to those items, including, for example, names associated with any of the stored features. In such aspects, a processor of the one or more processors 602 may download information from the map database 704 over a wired or wireless data connection to a communication network (e.g., over a cellular network and/or the Internet, etc.). In some cases, the map database 704 may store a sparse data model including polynomial representations of certain road features (e.g., lane markings) or target trajectories for the AV 600. The map database 704 may also include stored representations of various recognized landmarks that may be provided to determine or update a known position of the AV 600 with respect to a target trajectory. The landmark representations may include data fields such as landmark type, landmark location, among other potential identifiers.

Furthermore, the safety system 700 may include a driving model, e.g., implemented in an advanced driving assistance system (ADAS) and/or a driving assistance and automated driving system. By way of example, the safety system 700 may include (e.g., as part of the driving model) a computer implementation of a formal model such as a safety driving model. A safety driving model may be or include a mathematical model formalizing an interpretation of applicable laws, standards, policies, etc. that are applicable to self-driving (ground) vehicles. A safety driving model may be designed to achieve, e.g., three goals: first, the interpretation of the law should be sound in the sense that it complies with how humans interpret the law; second, the interpretation should lead to a useful driving policy, meaning it will lead to an agile driving policy rather than an overly-defensive driving which inevitably would confuse other human drivers and will block traffic and in turn limit the scalability of system deployment; and third, the interpretation should be efficiently verifiable in the sense that it can be rigorously proven that the self-driving (autonomous) vehicle correctly implements the interpretation of the law. A safety driving model, illustratively, may be or include a mathematical model for safety assurance that enables identification and performance of proper responses to dangerous situations such that self-perpetrated accidents can be avoided.

A safety driving model may implement logic to apply driving behavior rules such as the following five rules: Do not hit someone from behind, do not cut-in recklessly, right-of-way is given, not taken, be careful of areas with limited visibility, and if you can avoid an accident without causing another one, you must do it. It is to be noted that these rules are not limiting and not exclusive and can be amended in various aspects as desired. The rules rather represent a social driving contract that might be different depending on the region and may also develop over time. While these five rules are currently applicable in most of the countries they might not be complete and may be amended.

As described above, the AV 600 may include the safety system 700 as also described with reference to FIG. 7.

The AV 600 may include the one or more processors 602 e.g. integrated with or separate from an engine control unit (ECU) of the AV 600.

The safety system 700 may in general generate data to control or assist to control the ECU and/or other components of the AV 600 to directly or indirectly control the driving of the AV 600.

Figure 8:
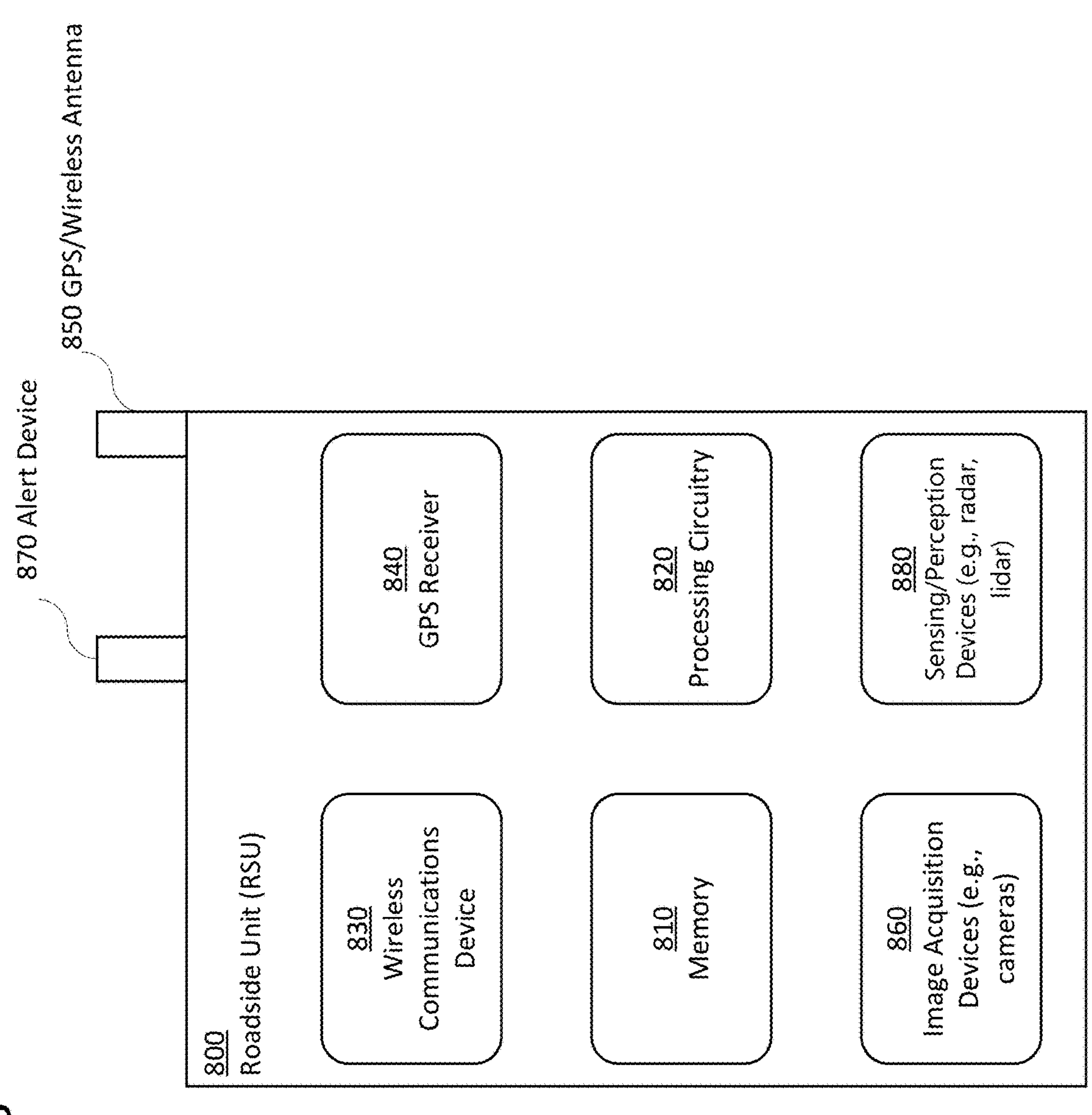
FIG. 8 illustrates a roadside unit in accordance with aspects of the disclosure.

FIG. 8 illustrates a roadside unit (RSU) 800 in accordance with aspects of the disclosure. The RSU 800 comprises, by way of example, a memory 810, processing circuitry 820, a wireless communication device 830, a GPS receiver 840, a GPS/wireless antenna 850, one or more image acquisition devices (e.g., cameras) 860, one or more alert devices (e.g., flashing red light) 870, and one or more sensing/perception devices (e.g., radar, lidar, or the like), and sensing/perception devices 880. The memory 810, otherwise known as a non-transitory computer-readable storage medium, is configured to store instructions that are to be executed by the processing circuitry 820. The sensing and perception devices 880, such as radar, lidar, or similar sensors, gather environmental perception data related to the ego AV 110 or a vicinity of the ego AV 110. The wireless communication device 830 is configured to receive and transmit data through the GPS/wireless antenna 850. The GPS receiver 840 is configured to provide position, time, and timekeeping signal for applications.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The terms "processor" as, for example, used herein may be understood as any kind of technological entity that allows handling of data. The data may be handled according to one or more specific functions executed by the processor. Further, a processor as used herein may be understood as any kind of circuit, e.g., any kind of analog or digital circuit. A processor may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

As used herein, "memory" is understood as a computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

A "vehicle" may be understood to include any type of driven object. By way of example, a vehicle may be a driven object with a combustion engine, a reaction engine, an electrically driven object, a hybrid driven object, or a combination thereof. A vehicle may be or may include an automobile, a bus, a mini bus, a van, a truck, a mobile home, a vehicle trailer, a motorcycle, a bicycle, a tricycle, a train locomotive, a train wagon, a moving robot, a personal transporter, a boat, a ship, a submersible, a submarine, a drone, an aircraft, a rocket, and the like.

Various embodiments herein may utilize one or more machine learning models to perform or control functions of the vehicle (or other functions described herein). The term "model" as, for example, used herein may be understood as any kind of algorithm, which provides output data from input data (e.g., any kind of algorithm generating or calculating output data from input data). A machine learning model may be executed by a computing system to progressively improve performance of a specific task. In some aspects, parameters of a machine learning model may be adjusted during a training phase based on training data. A trained machine learning model may be used during an inference phase to make predictions or decisions based on input data. In some aspects, the trained machine learning model may be used to generate additional training data. An additional machine learning model may be adjusted during a second training phase based on the generated additional training data. A trained additional machine learning model may be used during an inference phase to make predictions or decisions based on input data.

The machine learning models described herein may take any suitable form or utilize any suitable technique (e.g., for training purposes). For example, any of the machine learning models may utilize supervised learning, semi-supervised learning, unsupervised learning, or reinforcement learning techniques.

In supervised learning, the model may be built using a training set of data including both the inputs and the corresponding desired outputs (illustratively, each input may be associated with a desired or expected output for that input). Each training instance may include one or more inputs and a desired output. Training may include iterating through training instances and using an objective function to teach the model to predict the output for new inputs (illustratively, for inputs not included in the training set). In semi-supervised learning, a portion of the inputs in the training set may be missing the respective desired outputs (e.g., one or more inputs may not be associated with any desired or expected output).

In unsupervised learning, the model may be built from a training set of data including only inputs and no desired outputs. The unsupervised model may be used to find structure in the data (e.g., grouping or clustering of data points), illustratively, by discovering patterns in the data. Techniques that may be implemented in an unsupervised learning model may include, e.g., self-organizing maps, nearest-neighbor mapping, k-means clustering, and singular value decomposition.

Reinforcement learning models may include positive or negative feedback to improve accuracy. A reinforcement learning model may attempt to maximize one or more objectives/rewards. Techniques that may be implemented in a reinforcement learning model may include, e.g., Q-learning, temporal difference (TD), and deep adversarial networks.

Various aspects described herein may utilize one or more classification models. In a classification model, the outputs may be restricted to a limited set of values (e.g., one or more classes). The classification model may output a class for an input set of one or more input values. An input set may include sensor data, such as image data, radar data, LIDAR data and the like. A classification model as described herein may, for example, classify certain driving conditions and/or environmental conditions, such as weather conditions, road conditions, and the like. References herein to classification models may contemplate a model that implements, e.g., any one or more of the following techniques: linear classifiers (e.g., logistic regression or naive Bayes classifier), support vector machines, decision trees, boosted trees, random forest, neural networks, or nearest neighbor.

Various aspects described herein may utilize one or more regression models. A regression model may output a numerical value from a continuous range based on an input set of one or more values (illustratively, starting from or using an input set of one or more values). References herein to regression models may contemplate a model that implements, e.g., any one or more of the following techniques (or other suitable techniques): linear regression, decision trees, random forest, or neural networks.

A machine learning model described herein may be or may include a neural network. The neural network may be any kind of neural network, such as a convolutional neural network, an autoencoder network, a variational autoencoder network, a sparse autoencoder network, a recurrent neural network, a deconvolutional network, a generative adversarial network, a forward thinking neural network, a sum-product neural network, and the like. The neural network may include any number of layers. The training of the neural network (e.g., adapting the layers of the neural network) may use or may be based on any kind of training principle, such as backpropagation (e.g., using the backpropagation algorithm).

The techniques of this disclosure may also be described in the following examples.

Example 1. A component of an intelligent transportation infrastructure system, the component comprising: processing means; and a non-transitory computer-readable storage medium including instructions that, when executed by the processing means, cause the processing means to: receive, from a vehicle having autonomous driving capabilities, an autonomous driving disengagement request message; determine, based on perception data or analytics related to the vehicle or a vicinity of the vehicle, a disengagement level of a multiple-disengagement-level protocol and a corresponding post-disengagement vehicle action; and transmit to the vehicle an autonomous driving disengagement response message including a post-disengagement vehicle action instruction.

Example 2. The component of example 1, wherein the autonomous driving disengagement request message comprises an autonomous driving disengagement request reason.

Example 3. The component of example 1, wherein the perception data or analytics related to the vehicle or the vicinity of the vehicle is provided by the vehicle in or with the autonomous driving disengagement request message.

Example 4. The component of example 1, wherein the perception data or analytics related to the vehicle or the vicinity of the vehicle is provided by the vehicle, road actor, or another intelligent transportation infrastructure component in the vicinity of the vehicle, prior to the reception of the autonomous driving disengagement request message.

Example 5. The component of example 1, wherein the instructions further cause the processing means to: upon reception of the autonomous driving disengagement request message, initiate a pull request for additional perception data from a road actor or another intelligent transportation infrastructure component in the vicinity of the vehicle, and perform the determination step additionally based on the pulled perception data.

Example 6. The component of example 1, wherein the intelligent transportation infrastructure system comprises a roadside unit (RSU) located at an edge of the intelligent transportation infrastructure system, and the RSU comprises the component.

Example 7. The component of example 6, wherein the RSU comprises: sensing means for gathering the perception data from the vicinity of the vehicle.

Example 8. The component of example 1, wherein the post-disengagement vehicle action instruction causes a level of the vehicle's autonomous driving control to be reduced.

Example 9. The component of example 1, wherein prior to the transmission of the autonomous driving disengagement response message, the instructions further cause the processing means to: transmit to a data center a disengagement level request message including the determined disengagement level and the corresponding post-disengagement vehicle action for a compliance check with a capability of the vehicle or with local regulations.

Example 10. The component of example 9, wherein the instructions further cause the processing means to: perform the transmission of the autonomous driving disengagement response message to the vehicle after receiving from the data center a disengagement level response message indicating capability or regulatory compliance.

Example 11. The component of example 9, wherein the disengagement level request message transmitted to the data center further includes the perception data or analytics related to the vehicle or the vicinity of the vehicle.

Example 12. The component of example 1, wherein the instructions further cause the processing means to: transmit the autonomous driving disengagement response message to an emergency response data center.

Example 13. The component of example 1, wherein the instructions further cause the processing means to: transmit to another vehicle or another component in the intelligent transportation infrastructure system in the vicinity of the vehicle a broadcast message about the autonomous driving disengagement.

Example 14. The component of example 1, wherein the autonomous driving disengagement request message is triggered by a passenger in the vehicle.

Example 15. A roadside unit (RSU) of an intelligent transportation infrastructure system, the RSU comprising: processing means; and a non-transitory computer-readable storage medium including instructions that, when executed by the processing means, cause the processing means to: receive, from a vehicle having autonomous driving capabilities, an autonomous driving disengagement request message; determine, based on perception data or analytics related to the vehicle or a vicinity of the vehicle, a disengagement level of a multiple-disengagement-level protocol and a corresponding post-disengagement vehicle action; and transmit to the vehicle an autonomous driving disengagement response message including a post-disengagement vehicle action instruction.

Example 16. The RSU of example 15, further comprising: sensing means for gathering the perception data from the vicinity of the vehicle.

Example 17. The RSU of example 16, wherein prior to the transmission of the autonomous driving disengagement response message, the instructions further cause the processing means to: transmit to a data center, a disengagement level request message including the determined disengagement level and the corresponding post-disengagement vehicle action for a compliance check with a capability of the vehicle or with local regulations.

Example 18. The RSU of example 17, wherein the instructions further cause the processing means to: perform the transmission of the autonomous driving disengagement response message to the vehicle after receiving from the data center a disengagement level response message indicating capability or regulatory compliance.

Example 19. A non-transitory computer readable storage medium of an intelligent transportation infrastructure system having stored therein program instructions that when executed by processing circuitry, cause the processing circuitry to: receive from a vehicle having autonomous driving capabilities, an autonomous driving disengagement request message; determine, based on perception data or analytics related to the vehicle or a vicinity of the vehicle, a disengagement level of a multiple-disengagement-level protocol and a corresponding post-disengagement vehicle action; and transmit to the vehicle an autonomous driving disengagement response message including a post-disengagement vehicle action instruction.

Example 20. The method of example 19, wherein the program instructions further cause the processing circuitry to: upon reception of the autonomous driving disengagement request message, initiate a pull request for additional perception data from road actor or another intelligent transportation infrastructure component in the vicinity of the vehicle, and perform the determining step additionally based on the pulled perception data.

Example 21. The method of example 19, wherein the program instructions further cause the processing circuitry to: prior to the transmitting of the autonomous driving disengagement response message, transmit to a data center a disengagement level request message including the determined disengagement level and the corresponding post-disengagement vehicle action for a compliance check with a capability of the vehicle or with local regulations.

Example 22. The method of example 21, wherein the program instructions further cause the processing circuitry to: perform the transmitting of the autonomous driving disengagement response message to the vehicle after receiving from the data center a disengagement level response message indicating compliance.

Example 23. The method of example 19, wherein the program instructions further cause the processing circuitry to: transmit the autonomous driving disengagement response message to an emergency response data center.

Example 24. The method of example 19, wherein the program instructions further cause the processing circuitry to: transmit to a road actor or a roadside unit (RSU) in the intelligent transportation infrastructure system in the vicinity of the vehicle a broadcast message about the autonomous driving disengagement.

While the foregoing has been described in conjunction with exemplary aspect, it is understood that the term "exemplary" is merely meant as an example, rather than the best or optimal. Accordingly, the disclosure is intended to cover alternatives, modifications and equivalents, which may be included within the scope of the disclosure.

Although specific aspects have been illustrated and described herein, it will be appreciated by those of ordinary skill in the art that a variety of alternate and/or equivalent implementations may be substituted for the specific aspects shown and described without departing from the scope of the present application. This application is intended to cover any adaptations or variations of the specific aspects discussed herein.

The invention claimed is:

1. A component of an intelligent transportation infrastructure system, the component comprising:

a processor located in a roadside unit (RSU) separate from a vehicle; and a non-transitory computer-readable storage medium located in the RSU and including instructions that, when executed by the processor, cause the processor to:

receive, from the vehicle having autonomous driving capabilities, an autonomous driving disengagement request message;

determine, based on perception data or analytics related to the vehicle or a vicinity of the vehicle, a disengagement level of a multiple-disengagement-level protocol and a corresponding post-disengagement vehicle action, wherein the multiple-disengagement-level protocol comprises disengagement levels DL-1 through DL-6, each disengagement level being associated with a different urgency level and a different post-disengagement vehicle action; and transmit to the vehicle an autonomous driving disengagement response message including a post-disengagement vehicle action instruction.

2. The component of claim 1, wherein the autonomous driving disengagement request message comprises an autonomous driving disengagement request reason.

3. The component of claim 1, wherein the perception data or analytics related to the vehicle or the vicinity of the vehicle is provided by the vehicle in or with the autonomous driving disengagement request message.

4. The component of claim 1, wherein the perception data or analytics related to the vehicle or the vicinity of the vehicle is provided by the vehicle, road actor, or another intelligent transportation infrastructure component in the vicinity of the vehicle, prior to the reception of the autonomous driving disengagement request message.

5. The component of claim 1, wherein the instructions further cause the processor to:

upon reception of the autonomous driving disengagement request message, initiate a pull request for additional perception data from a road actor or another intelligent transportation infrastructure component in the vicinity of the vehicle, and perform the determination step additionally based on the pulled perception data.

6. The component of claim 1, wherein the RSU comprises:

a sensor located in the RSU and configured to gather the perception data from the vicinity of the vehicle.

7. The component of claim 1, wherein the post-disengagement vehicle action instruction causes a level of the vehicle's autonomous driving control to be reduced.

8. The component of claim 1, wherein prior to the transmission of the autonomous driving disengagement response message, the instructions further cause the processor to:

transmit to a data center a disengagement level request message including the determined disengagement level and the corresponding post-disengagement vehicle action for a compliance check with a capability of the vehicle or with local regulations.

9. The component of claim 8, wherein the instructions further cause the processor to:

perform the transmission of the autonomous driving disengagement response message to the vehicle after receiving from the data center a disengagement level response message indicating capability or regulatory compliance.

10. The component of claim 8, wherein the disengagement level request message transmitted to the data center further includes the perception data or analytics related to the vehicle or the vicinity of the vehicle.

11. The component of claim 1, wherein the instructions further cause the processor to:

transmit the autonomous driving disengagement response message to an emergency response data center.

12. The component of claim 1, wherein the instructions further cause the processor to:

transmit to another vehicle or another component in the intelligent transportation infrastructure system in the vicinity of the vehicle a broadcast message about autonomous driving disengagement.

13. The component of claim 1, wherein the autonomous driving disengagement request message is triggered by a passenger in the vehicle.

14. The component of claim 1, wherein DL-5 and DL-6 correspond to very urgent and extremely urgent levels, respectively, and wherein the post-disengagement vehicle action for DL-5 and DL-6 includes transmitting a message to an emergency response data center.

15. A roadside unit (RSU) of an intelligent transportation infrastructure system, the RSU comprising:

a processor located separate from a vehicle; and a non-transitory computer-readable storage medium located separate from the vehicle and including instructions that, when executed by the processor, cause the processor to:

receive, from the vehicle having autonomous driving capabilities, an autonomous driving disengagement request message;

determine, based on perception data or analytics related to the vehicle or a vicinity of the vehicle, a disengagement level of a multiple-disengagement-level protocol and a corresponding post-disengagement vehicle action, wherein the multiple-disengagement-level protocol comprises disengagement levels DL-1 through DL-6, each disengagement level being associated with a different urgency level and a different post-disengagement vehicle action; and transmit to the vehicle an autonomous driving disengagement response message including a post-disengagement vehicle action instruction.

16. The RSU of claim 15, further comprising:

a sensor located separate from the vehicle and configured to gather the perception data from the vicinity of the vehicle.

17. The RSU of claim 16, wherein prior to the transmission of the autonomous driving disengagement response message, the instructions further cause the processor to:

transmit to a data center, a disengagement level request message including the determined disengagement level and the corresponding post-disengagement vehicle action for a compliance check with a capability of the vehicle or with local regulations.

18. The RSU of claim 17, wherein the instructions further cause the processor to:

perform the transmission of the autonomous driving disengagement response message to the vehicle after receiving from the data center a disengagement level response message indicating capability or regulatory compliance.

19. A non-transitory computer-readable storage medium of an intelligent transportation infrastructure system having stored therein program instructions that when executed by processing circuitry, cause the processing circuitry to:

receive from a vehicle having autonomous driving capabilities, an autonomous driving disengagement request message;

determine, based on perception data or analytics related to the vehicle or a vicinity of the vehicle, a disengagement level of a multiple-disengagement-level protocol and a corresponding post-disengagement vehicle action, wherein the multiple-disengagement-level protocol comprises disengagement levels DL-1 through DL-6, each disengagement level being associated with a different urgency level and a different post-disengagement vehicle action; and transmit to the vehicle an autonomous driving disengagement response message including a post-disengagement vehicle action instruction, wherein the storage medium is located in a roadside unit (RSU) separate from the vehicle, and wherein the processing circuitry is located in the RSU.

20. The non-transitory computer-readable storage medium of claim 19, wherein the program instructions further cause the processing circuitry to:

upon reception of the autonomous driving disengagement request message, initiate a pull request for additional perception data from road actor or another intelligent transportation infrastructure component in the vicinity of the vehicle, and perform the determining step additionally based on the pulled perception data.

21. The non-transitory computer-readable storage medium of claim 19, wherein the program instructions further cause the processing circuitry to:

prior to the transmitting of the autonomous driving disengagement response message, transmit, to a data center, a disengagement level request message including the determined disengagement level and the corresponding post-disengagement vehicle action for a compliance check with a capability of the vehicle or with local regulations.

22. The non-transitory computer-readable storage medium of claim 21, wherein the program instructions further cause the processing circuitry to:

perform the transmitting of the autonomous driving disengagement response message to the vehicle after receiving, from the data center, a disengagement level response message indicating compliance.

23. The non-transitory computer-readable storage medium of claim 19, wherein the program instructions further cause the processing circuitry to:

transmit the autonomous driving disengagement response message to an emergency response data center.

24. The non-transitory computer-readable storage medium of claim 19, wherein the program instructions further cause the processing circuitry to:

transmit to a road actor or another roadside unit (RSU) in the intelligent transportation infrastructure system in the vicinity of the vehicle a broadcast message about autonomous driving disengagement.

* * * * *